United States Patent
Hotaka et al.

(10) Patent No.: US 8,334,333 B2
(45) Date of Patent: Dec. 18, 2012

(54) RUBBER COMPOSITES FOR TIRE TREADS AND TIRE

(75) Inventors: Takeshi Hotaka, Saitama (JP); Tetsuya Mizone, Saitama (JP); Emiko Mogi, Saitama (JP); Shinya Notomi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 12/644,562

(22) Filed: Dec. 22, 2009

(65) Prior Publication Data

US 2010/0160489 A1 Jun. 24, 2010

(30) Foreign Application Priority Data

Dec. 22, 2008 (JP) ................. 2008-324844

(51) Int. Cl.
*B60C 1/00* (2006.01)
*C08K 3/04* (2006.01)
*C08K 3/36* (2006.01)

(52) U.S. Cl. ........ 524/492; 524/493; 524/495; 524/496; 524/700; 523/150; 523/152

(58) Field of Classification Search ............. 523/150, 523/152; 524/492, 493, 495, 496, 700
See application file for complete search history.

(56) References Cited

U.S. PATENT DOCUMENTS

2005/0096424 A1 5/2005 Otsuji et al.

FOREIGN PATENT DOCUMENTS

| EP | 2163578 A1 | 3/2010 |
|---|---|---|
| JP | 2008-088236 A | 4/2008 |
| WO | WO 2008149585 A1 * | 12/2008 |

OTHER PUBLICATIONS

France Search Report dated Jun. 14, 2010, issued in corresponding France Patent Application No. 0959361.
English Translation of corresponding Japanese Application No. 2005-280534, published Oct. 13, 2005.

* cited by examiner

*Primary Examiner* — Ling Choi
*Assistant Examiner* — Darcy D LaClair Lynx
(74) *Attorney, Agent, or Firm* — Westerman, Hattori, Daniels & Adrian, LLP

(57) ABSTRACT

The rubber composites for tire treads include silica; carbon black; and oil constituents, wherein a ratio (A index) of silica contents, carbon black contents, and oil constituents contents is represented by A index=silica contents/(carbon black contents+silica contents+oil constituents contents)$\geq$0.8; and a ratio (B index) of a complex elastic modulus $E^*$ at 30° C. and a loss tangent tan $\delta$ at 60° C. is represented by B index=$E^*$/tan $\delta \geq 120$.

2 Claims, 4 Drawing Sheets

US 8,334,333 B2

RUBBER COMPOSITES FOR TIRE TREADS AND TIRE

BACKGROUND OF THE INVENTION

1. Field of the Invention

The present invention relates to rubber composites for tire treads and a tire in which the rubber composites are applied to a tread section.

2. Description of the Related Art

Recently, it has ever increasingly been contrived to attain reduced fuel consumption of an automobile, as compared with the past, considering a demand for energy saving and the reduction of an environmental load. Especially, this shows a marked trend toward the further reduction of the rolling resistance, particularly in tires. As rubber composites for tire treads, it has been known ones where silica is mainly utilized as filler and which contain less total filler contents composed of carbon black and silica than what are usually used, in order to reduce a rolling resistance of a tire adopted thereof (e.g., see Patent Document 1: Unexamined Japanese Patent Application Publication No. 2008-88236).

It is said that such rubber composites for tire treads effectively decrease the exothermicity due to their little filler contents, which contrives to reduce the rolling resistance.

However, the reduction of the filler contents in the rubber composites for tire treads newly entails a problem that the tread section suffers from low stiffness, resulting in degradation of braking performance.

Accordingly, it has been heretofore longed for the advent of rubber composites for tire treads capable of contriving to reduce the rolling resistance while keeping good braking performance.

Thus, an objective of the present invention is to provide rubber composites for tire treads and a tire applied to the tread section able to achieve both the reduced rolling resistance and the ensured good braking performance.

SUMMARY OF THE INVENTION

A distinguishing feature of the present invention aiming at solving the aforementioned problem lies in that rubber composites for tire treads comprise silica; carbon black; and oil constituents, wherein a ratio (A index) of silica contents, carbon black contents, and oil constituents contents is found by A index=silica contents/(carbon black contents+silica contents+oil constituents contents)≧0.8 relational expression (1); and a ratio (B index) of a complex elastic modulus E* at 30° C. and a loss tangent tan δ at 60° C. is found by B index=E*/tan δ≧120 . . . relational expression (2).

Further, a distinguishing feature of the present invention aiming at solving the aforementioned problem lies in that a tire wherein the rubber composites for tire treads are applied to a tread section.

According to the present invention, the invention enables providing the rubber composites for tire treads achieving both the reduced rolling resistance and the ensured good braking performance, and the tire applied to the tread section.

DETAILED DESCRIPTION OF THE INVENTION

Hereinafter, an embodiment according to the present invention will be described in detail, properly referring to the attached drawings.

A distinguishing feature of the tire according to the embodiment lies in that the rubber composites for tire treads explained later are principally adopted.

Figure 1:
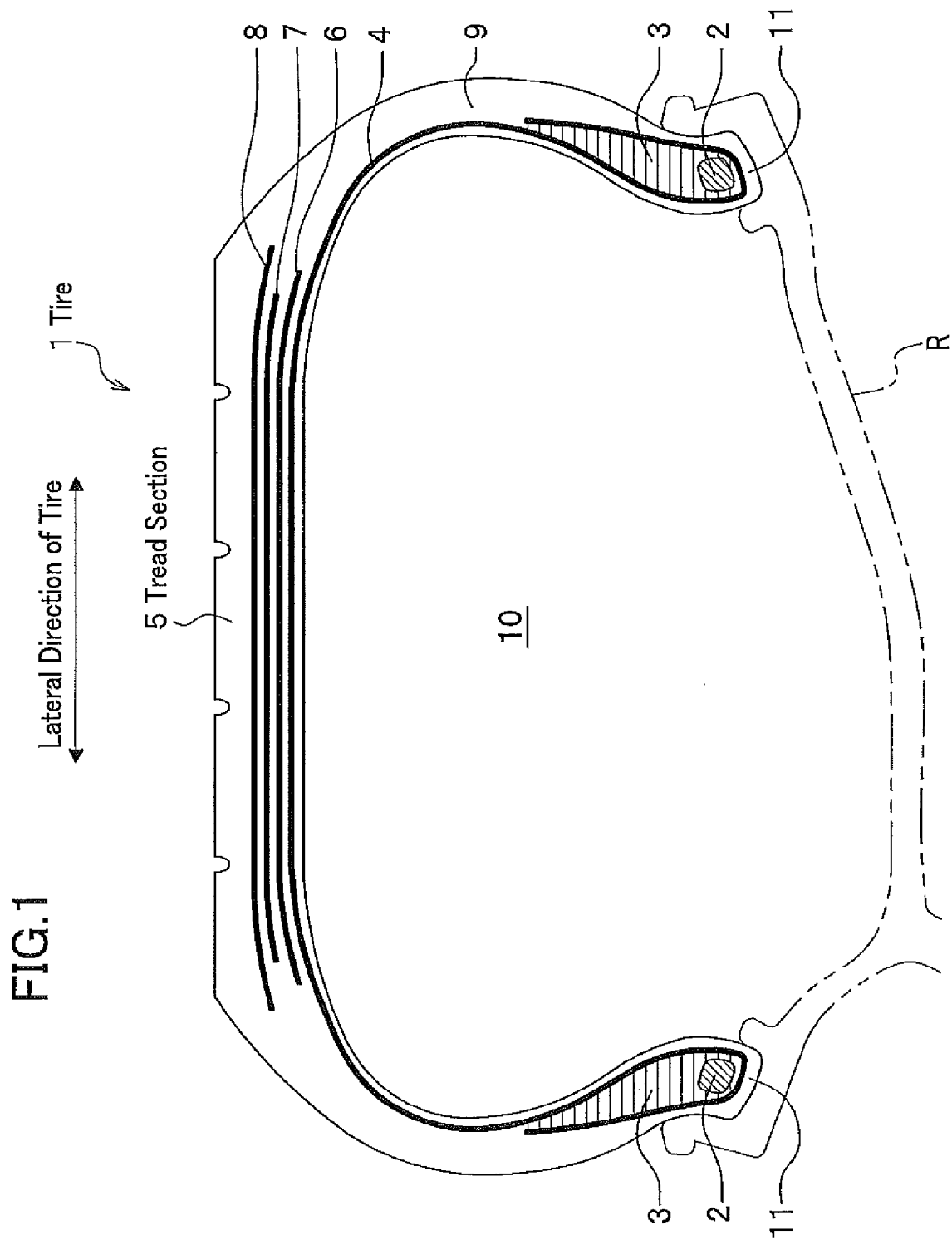
FIG. 1 is a sectional view of a tire according to an embodiment of the present invention, and a view partially showing a section along a rotating shaft.

As shown in FIG. 1, a tire 1 according to the embodiment is a pneumatic radial tire and includes a tread section 5 contacting the ground, a bead section 11 assembled in a rim R, a side wall section 9 connecting the bead section 11 and the tread section 5. Moreover, the bead section 11 of the tire 1 is assembled, in an air-tight manner, in the rim section R and thereby forms an air chamber 10.

The tire 1 is further provided with a carcass layer 4 serving as a framework of the tire 1. The carcass layer 4 presents a toroidal shape extending in the circumferential direction of the rim R. The end of the inner peripheral side thereof is folded over so as to enfold the bead core 2 and the bead filler 3.

The carcass layer 4 is formed by a cord layer on which rubber is coated. A plurality of carcass cords forming the cord layer are running in the circumferential direction orthogonal to the radial direction of the tire so as to surround the air chamber 10.

Figure 2:
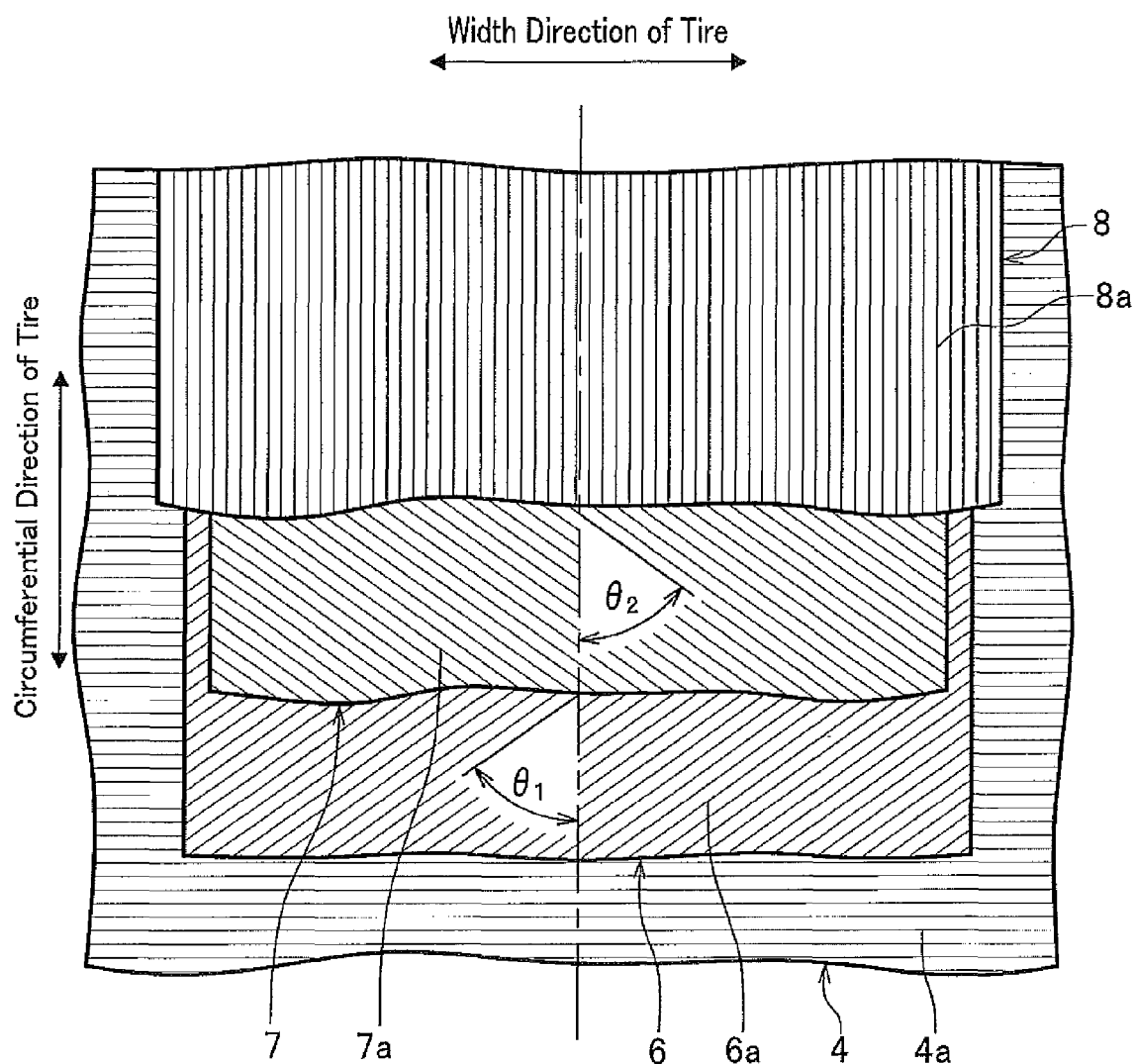
FIG. 2 is a developed view showing a multilayer structure of a reinforced layer, a belt layer, and a carcass layer, and a partial view viewing from an outer peripheral side of the tire.

On the outside of the carcass layer 4, belt layers 6,7 and a reinforced layer 8 are arranged in this order, as shown in FIGS. 1 and 2.

The belt layers 6,7 are running in the circumferential direction of the tire and play a role of maintaining a geometry of the tire 1 by taking advantage of the hoop effect compressing the carcass layer 4 toward the inside of the tire 1. The belt layer 6,7 are produced by connecting the both ends of a belt form material formed by bias cutting the cord layers on which rubber is coated. More particularly, as shown in FIG. 2, a slant of each of belt cords 6a, 7a is mutually reversed relative to the circumferential direction of the tire. In this connection, in FIG. 2, a reference numeral 4a denotes a carcass cord of the expanded carcass layer 4.

A slant $\theta_1$ of the belt cord 6a and a slant $\theta_2$ of the belt cord 7a with respect to the circumferential direction of the tire 1 are equal to each other. Generally, while the $\theta_1$ and $\theta_2$ are set to 17 to 27 degrees, the $\theta_1$ and $\theta_2$ of the tire 1 of the embodiment are set to 45 to 65 degrees proximate to a peculiar angle (54.7). In this connection, since the tire 1 of which $\theta_1$ and $\theta_2$ are set so as to be equal to the peculiar angle (54.7) can remarkably reduce the stiffness in the circumferential direction of the tire 1, no difference in a lateral tensile force of the belt layers 6, 7 will be taken place because of the ground contact deformation of the tire 1. As a result, the tire 1, having the belt layers 6,7 (wide-angle belt) of which $\theta_1$ and $\theta_2$ are set to a wider angle than a normal belt layer by setting the $\theta_1$ and $\theta_2$ to 45 to 65 degrees, can suppress torsional deformation of the tire 1, thus reducing a lateral force (plysteer).

The reinforced layer 8 is formed by spirally winding the cord 8a in the circumferential direction of the tire around the belt layer 6,7 to reinforce the belt layers 6,7. In this connection, the cord 8a, shown in FIG. 2, is depicted, for reasons of drawing, in such a manner as mutually standing in a line in parallel relative to the circumferential direction of the tire.

In the tire 1 of the embodiment, the tread section 5 (tread rubber) is formed with rubber composites for tire treads which are explained next.

The rubber composites for tire treads meet both the following relational expressions (1) and (2).

$$A \text{ index} = \text{silica contents}/(\text{carbon black contents} + \text{silica contents} + \text{oil constituents contents}) \geq 0.8 \quad \text{relational expression (1)}$$

(where in the relational expression (1), each content is a mass conversion value).

$$B \text{ index} = E^*/\tan \delta \geq 120 \quad \text{relational expression (2)}$$

(where in the relational expression (2), $E^*$ denotes a complex elastic modulus of the rubber composites for tire treads at 30° C., and tan δ denotes a loss tangent of the same at 60° C.

The rubber composites for tire treads of the embodiment are composed of the same material as publicly known rubber composites for tire treads, except for the silica and carbon black as reinforcing filler, as well as the oil constituents for defining the above-mentioned A index. The rubber composites for tire treads may contain, at need, as much amount as being normally used, base rubber, antioxidants, zinc oxide, wax, curling agents, and vulcavization accelerator etc.

Hereupon, it is advisable for the rubber composites for tire treads of the embodiment to select one that only contains the silica, free from the carbon black, as filler for reinforcement.

As the silica described in the embodiment, no special limitation is put thereon, as far as it may be used for the tire. For example, natural silica or synthetic silica (dry-process silica, wet-process silica) may be used. Among other things, it is preferable to use silica having a small specific surface area (silica where CTAB=120 $m^2/g$ or less, and BET=125 $m^2/g$ or less. For instance, ZEOSIL116GR made by Rhodia Japan Ltd.) is desirable.

As the carbon black described in the embodiment, no special limitation is placed thereon, as long as it may be used for the tire. For instance, carbon blacks, such as SAF, SAF-HS, ISAF, ISAF-HS, HAF, MAF, FEF, and SRF etc., may be used, which are based on the rubber industry handbook issued by the Society of Rubber Industry Japan.

As the oil constituents, oil constituents may be used for the tire which are utilized as extending oil (process oil). For example, paraffinic oil, naphtenic oil, and aromatic oil etc., may be used. The oil constituents contain silane coupling agents. Incidentally, the process oil originally contained in the base rubber (oil-extended rubber) is also added to the oil constituents of the embodiment. Hence, the oil constituents of the rubber composites for tire treads may be composed only of the oil constituents originally contained in the base rubber (oil-extended rubber), as far as they meet the above relational expression (1).

"The complex elastic modulus $E^*$ at 30° C." and "the loss tangent tan δ at 60° C." of the rubber composites for tire treads of the embodiment are adjusted so as to meet the above relational expression (2).

The complex elastic modulus $E^*$ is a value represented by $\sqrt{(r^2+r'^2)}$, where r is storage elastic modulus of the rubber composites for tire treads and r' is loss elastic modulus. The loss tangent tan δ a value represented by a ratio (r'/r) of the loss elastic modulus r' versus the storage elastic modulus r of the rubber composites for tire treads, and δ designates a phase delay of a stress versus a dynamic stress of the rubber composites for tire treads.

With the rubber composites for tire treads of the present invention thus explained in the above, the invention allows providing, as will be elucidated by examples mentioned later, the tire 1 realizing both the reduced rolling resistance and the ensured good braking performance, which have been hitherto deemed to be impossible with the existing rubber composites for tire treads. The rubber composites for tire treads enable contriving to reduce the rolling resistance and improve the tire driving stiffness (see Kx discussed later), thereby greatly contributing to increased fuel efficiency of a vehicle equipped therewith.

Furthermore, the rubber composites for tire treads allow more reduced rolling resistance by applying them to the tread section 5 (tread rubber) of the tire 1 of the embodiment in which the aforesaid wide-angle belt is utilized.

It is to be appreciated that the present invention may be exploited in various forms, without being necessarily limited to the afore-mentioned embodiment.

Whereas in the above-mentioned embodiment, an illustrative example in which the rubber composites for tire treads are applied to the radial tire employing the wide-angle belt is given, the rubber composites for tire treads may instead be applied to another pneumatic tires.

EXAMPLES

Next, an explanation will be more specifically made referring to examples (examples 1 to 3 and comparative examples 1 to 5).

In the examples and the comparative examples to be explained herein, the rubber composites for tire treads are prepared in composition (parts by mass) listed in Table 1-1 and Table 1-2.

TABLE 1-1

| Raw Materials | Example 1 | Example 2 | Example 3 |
|---|---|---|---|
| NR | 30.00 | 30.00 | 30.00 |
| S-SBR(a) | | | |
| S-SBR(b) | 50.00 | 50.00 | 50.00 |
| BR | 20.00 | 20.00 | 20.00 |
| CB | 5.00 | | |
| Silica (a) | 75.00 | 80.00 | |
| Silica (b) | | | 80.00 |
| Processing Aid | 4.00 | 4.00 | 4.00 |
| Antioxidants (a) | 3.50 | 3.50 | 3.50 |
| Antioxidants (b) | 2.00 | 2.00 | 2.00 |
| Wax (a) | 1.00 | 1.00 | 1.00 |
| Wax (b) | 1.00 | 1.00 | 1.00 |
| Vulcanization aid | 1.00 | 1.00 | 1.00 |
| Zinc oxide | 3.00 | 3.00 | 3.00 |
| Coupling Agents | 6.40 | 6.40 | 6.40 |
| Process Oil | 2.00 | 2.00 | 2.00 |
| Vulcanizing agents | 1.70 | 1.70 | 1.70 |
| Vulcanization accelerators | 2.50 | 2.50 | 2.50 |
| Vulcanization accelerators aid | 1.00 | 1.00 | 1.00 |
| Total Parts by Mass | 209.10 | 209.10 | 209.10 |
| Tan δ (60° C.) | 0.195 | 0.189 | 0.100 |
| E* | 28.73 | 30.14 | 17.46 |
| A index | 0.85 | 0.90 | 0.90 |
| B index | 147.33 | 159.31 | 174.14 |
| Braking | 103 | 103 | 105 |

TABLE 1-1-continued

| Raw Materials | Example 1 | Example 2 | Example 3 |
|---|---|---|---|
| Distance (WET) | | | |
| Rolling Resistance | 93 | 88 | 78 |
| Kx | 119 | 123 | 150 |
| Mode Fuel Consumption | 102 | 102 | 105 |

TABLE 1-2

| Raw Materials | Comparative Example 1 | Comparative Example 2 | Comparative Example 3 | Comparative Example 4 | Comparative Example 5 |
|---|---|---|---|---|---|
| NR | 30.00 | 30.00 | 30.00 | 30.00 | 30.00 |
| S-SBR(a) | 96.25 | | | | |
| S-SBR(b) | | 50.00 | 50.00 | 50.00 | 50.00 |
| BR | | 20.00 | 20.00 | 20.00 | 20.00 |
| CB | 20.0 | 20.00 | 10.00 | | |
| Silica (a) | 80.00 | 80.00 | 70.00 | 80.00 | |
| Silica (b) | | | | 80.00 | |
| Processing Aid | 4.00 | 4.00 | 4.00 | 4.00 | 4.00 |
| Antioxidants (a) | 3.50 | 3.50 | 3.50 | 3.50 | 3.50 |
| Antioxidants (b) | 2.00 | 2.00 | 2.00 | 2.00 | 2.00 |
| Wax (a) | 1.00 | 1.00 | 1.00 | 1.00 | 1.00 |
| Wax (b) | 1.00 | 1.00 | 1.00 | 1.00 | 1.00 |
| Vulcanization aid | 1.00 | 1.00 | 1.00 | 1.00 | 1.00 |
| Zinc oxide | 3.00 | 3.00 | 3.00 | 3.00 | 3.00 |
| Coupling Agents | 6.40 | 6.40 | 6.40 | 6.40 | 6.40 |
| Process Oil | 12.00 | 12.00 | 2.00 | 2.00 | 2.00 |
| Vulcanizing agents | 1.70 | 1.70 | 1.70 | 2.30 | 2.00 |
| Vulcanization accelerators | 2.50 | 2.50 | 2.50 | 1.50 | 1.80 |
| Vulcanization accelerators aid | 1.00 | 1.00 | 1.00 | 0.25 | 0.30 |
| Total Parts by Mass | 265.35 | 239.10 | 209.10 | 207.95 | 208.00 |
| Ttotal Mass | | | | | |
| Tan δ (60° C.) | 0.185 | 0.160 | 0.201 | 0.218 | 0.132 |
| E* | 13.73 | 20.34 | 26.03 | 16.73 | 15.15 |
| A index | 0.55 | 0.68 | 0.79 | 0.90 | 0.90 |
| B index | 74.29 | 127.31 | 129.50 | 76.74 | 114.77 |
| Braking Distance (WET) | 100 | 100 | 101 | 98 | 98 |
| Rolling Resistance | 100 | 109 | 121 | 109 | 95 |
| Kx | 100 | 120 | 120 | 102 | 94 |
| Mode Fuel Consumption | 100 | 99 | 98 | 98 | 99 |

In Table 1-1 and Table 1-2, NR as a raw material denotes natural rubber, S-SBR (a) denotes styrene-butadiene copolymer rubber (NS440) made by ZEON CORPORATION; S-SHR(b) denotes styrene-butadiene copolymer rubber (NS116R) made by ZEON CORPORATION; BR denotes PolyButadiene (UBEPOL-VCR617) made by Ube Industries, Ltd; CB denotes carbon black (SEAST (registered trademark) KH (N339)) made by TOKAI CARBON CO., LTD; Silica (a) denotes silica (Nipsil (registered trademark) AQ-N) made by TOSOH SILICA CORPORATION; Silica (b) denotes silica (ZEOSIL115GR) made by Rhodia Japan; Production Aid denotes EF44 made by STRUKTOL; Antioxidants (a) denotes NOCRAC 6C made by Kiuchi Shinko Chemical; Antioxidants (b) denotes NOCRAC 224 made by Kiuchi Shinko Chemical; Wax (a) denotes low temperature wax made by NIPPON SEIRO CO. LTD; Wax (b) denotes high temperature wax made by NIPPON SEIRO CO. LTD; Vulcanization aid denotes Stearic acid; Zinc Oxide denotes 3 Zinc Oxide; Coupling Agents denotes CABRUS (registered trademark)-2B made by DAISO; Process Oil denotes NS-90S made by Idemitsu Kosan Company; Curling Agents denotes soluble sulfur; Vulcanization accelerators denotes NOC-CELER (registered trademark) CZ-G made by Kiuchi Shinko Chemical, Vulcanization accelerators aid denotes NOC CELER (registered trademark) D made by Kiuchi Shinko Chemical.

The calculated values of the above-mentioned index A of the respective rubber composites for tire treads prepared in the examples 1 to 3 and the comparative examples 1 to 5 are juxtaposed in Table 1-1 and Table 1-2.

<Measurement of Complex Elastic Modulus E* and Loss Tangent Tan δ>

Measurements are conducted to the complex elastic modulus E* (30° C.) at 30° C. and the loss tangent (tan δ (60° C.) at 60° C., respectively, for each of the prepared rubber composites for tire treads. The results are shown in Table 1-1 and Table 1-2, where a unit of E* (30° C.) is MPa. Hereupon, Dynamic Viscoelastic Properties Measurement Device (EPLEXOR) made by GABO is utilized for these measurements. At this juncture, the dynamic load displacement (dynamic skew) is set to 1%.

<Measurement of Rolling Resistance and Tire Driving Stiffness>

First, the tire 1 based on the 195/65R15 standard is manufactured by the conventional method, which has the same structure as the tire 1 as shown in FIG. 1 and FIG. 2, and in which the rubber composites for tire treads prepared by each example and comparative example are adopted for the tread section 5 (tread rubber).

Figure 3:
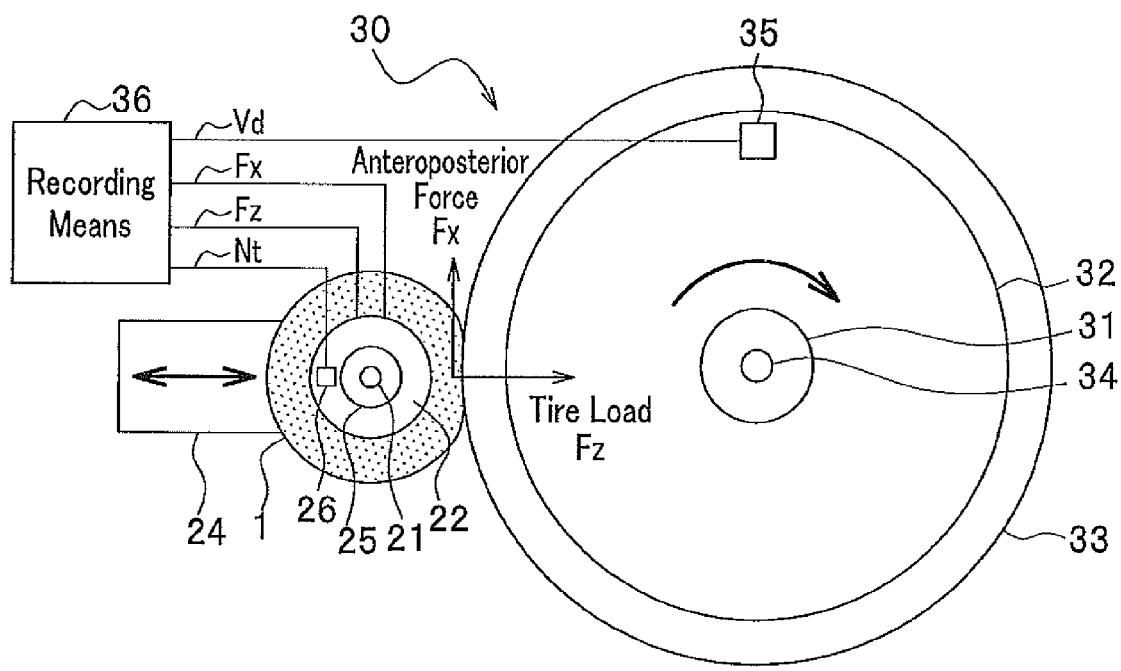
FIG. 3 is a schematic diagram of a tire rolling testing machine.

Then, the rolling resistance and tire driving stiffness of the tire 1 at 80 km/h are measured by means of a drum-type tire testing machine (hereinafter, often simply referred to as "tire rolling testing machine"). FIG. 3 to be referred to herein is a schematic diagram of the tire rolling testing machine.

As depicted in FIG. 3, a tire rolling testing machine 30 includes a tire rotating shaft 21 rotatably supporting the tire 1; a tire motor 25 enabling a tire rotational frequency Nt (rpm) to increase and decrease while rotating the tire 1; a test drum 32 rotating around a drum rotating shaft 34; a drum motor 31 enabling the test drum 32 to be rotated at a drum speed of Vd (km/h); and a load applying means 24 causing the contact area of the tire 1 to be pressed against the test drum 32 with a radial force Fz (N). The test drum 32 has a safety-walk road surface 33 (3M Corp.) stuck on a surface of an outer periphery thereof so that it becomes equivalent to a dry road surface and rotates integrally with the test drum 32. Alternatively, the tire rolling testing machine 30 stated herein may of course use commercially available launched products, as long as they have the same arrangement as the tire rolling testing machine.

The tire rolling testing machine 30 is able to produce an tangential force Fx (N) by causing the tire rotational frequency Nt to increase and decrease while applying the radial force Fz to the tire 1.

The tire rotating shaft 21 and the drum rotating shaft 34 are arranged so as to be in parallel with each other.

The drum motor 31 is allowed to rotate the test drum 32 at the constant drum speed Vd. Besides, the rotating shaft 21 of the tire motor 25 is coupled to the tire rotating shaft 21. Further, the rotating shaft of the drum motor 31 is coupled to the drum rotating shaft 34. The load applying means 24 presses the contact surface of the tire 1 against the test drum 32 with the radial force Fz in the direction of connecting the tire rotating shaft 21 and the drum rotating shaft 34, specifically, in the direction extending from the tire rotating shaft 21 to the drum rotating shaft 34.

The tire rolling testing machine 30 includes a rotational frequency measuring means 26 measuring the tire rotational frequency Nt and a speedmeter 35 measuring the drum speed Vd, and further includes a load cell 22 composed of a load cell measuring the radial force Fz and an tangential force road cell measuring the tangential force Fx acting on the tire 1. The tire rolling testing machine 30 measures, in plural time periods, the drum speed Vd, the tire rotational frequency Nt, the tangential force Fx, and the radial force Fz, respectively within the time when the tire rotational frequency Nt increases and decreases. In parenthesis, the tangential force Fx acts on the tire 1 in the direction vertical to the direction extending from the tire rotating shaft 21 to the drum rotating shaft 34, and in the direction vertical to the direction of the tire rotating shaft 21.

Additionally, the tire rolling testing machine 30 includes a recording means 36 recording the measurement results of the drum speed Vd, the tire rotational frequency Nt, the tangential force Fx, and the radial force Fz. The tire rolling testing machine 30 records the measurement results of the drum speed Vd, the tire rotational frequency Nt, the tangential force Fx, and the radial force Fz, measured in plural time periods, within the time when the tire rotational frequency Nt increases and decreases correlating with the time periods measured. Causing the tire rotational frequency Nt to increase and decrease controls the tire rotational frequency Nt of the tire 1, and varies a relative speed of the tire 1 and the test drum 32, which occurs a slip by the tire 1 and the test drum 32. A slip ratio Rs quantifying the slip has a first order correlation with the tangential force Fx.

Since the tire rolling testing machine 30 can read out the drum speed Vd, the tire rotational frequency Nt, the tangential load Fx, and the radial force Fz correlating with their time periods measured, it is possible to calculate, every time measured, the slip ratio Rs from the drum speed Vd and the tire rotational frequency Nt, correlating therewith. Then, a relation of the tangential force Fx (N) and the slip ratio Rs, each being correlated with the time periods measured, is calculated by using the linear regression equation (3) expressed by Fx=Kx*Rs+Rr and thereby can find the tire driving stiffness Kx (N). In the equation (3), Rr denotes the tire rolling resistance (N) of the tire to the road surface.

The calculated values of the B index of the tire 1 manufactured in the examples 1 to 3 and the comparative examples 1 to 5 are listed in juxtaposition form in Table 1-1 and Table 1-2.

In this connection, the rolling resistance shows that the smaller the value shown in Table 1-1 and Table 1-2 the lower (better) the rolling resistance of the tire 1, and the tire driving stiffness (Kx) shows that the larger the value shown in Table 1-1 and Table 1-2 the higher (better) the tire driving stiffness.

<Measurement of Mode Fuel Consumption>

Measurements of the mode fuel consumption based on the 10·15 mode are carried out for each of the tires 1 manufactured. The mode fuel consumption of the tire 1 produced in the examples 1 to 3 and the comparative examples 2 to 5 are listed In Table 1-1 and Table 1-2, using a conversion value, with the mode fuel consumption of the comparative example 1 as 100.

In this connection, the mode fuel consumption shows that the larger the value indicated in Table 1-1 and Table 1-2 the better the fuel consumption.

<Measurement of Braking Distance (WET)>

Measurements of the sectional braking distance are carried out for each of the tires 1 manufactured, in the case where a speed is decelerated from 90 km/h to 20 km/h, under the condition that the tire 1 having a regular inflation pressure fitted to an FF (Front Engine Front Drive) vehicle of 2.0 L and that an ABS (Anti-lock Brake System) is operated, at full braking from an initial speed of 100 km/h to stop, on an wet asphalt road surface. Subsequently, the resultant measured values are indicated at an exponential ratio, in Table 1-1 and Table 1-2, with the braking performance of the tire 1 of the comparative example 1 as 100. The values indicate that the larger the value the better the braking performance.

In this connection, in Table 1-1 and Table 1-2, as for ones that meet the relational expressions (1) and (2), concerning the A and B indexes, as well as ones superior in the braking distance (braking performance), the rolling resistance, the tire driving stiffness (Kx), and mode fuel consumption to the comparative example 1 are indicated by applying hatching to the corresponding columns.

(Evaluation of Rubber Composites for Tire Treads of Examples and Comparative Examples)

As indcted in Table 1-1 and Table 1-2, the rubber composites for tire treads produced in the examples 1 to 3 have the A index greater than or equal to 0.8 (example 1: 0.85, example 2: 0.90, example 3: 0.90), and the B index greater than or equal to 120 (example 1: 147.33, example 2: 2.159.31, example 3: 174.14). Thus, the rubber composites for tire treads meet the relational expressions (1) and (2) at the same time.

The tire 1 in which the rubber composites for tire treads produced in the examples 1 to 3 are used for the tread rubber achieves both the improved braking performance and the reduced rolling resistance, as shown in Table 1-1 and Table 1-2.

In contrast, the rubber composites for tire treads made in the comparative example 1 neither meet the relational expression (1) nor the relational expression (2). In the comparative examples 4 and 5, the A index of the rubber composites for tire treads is 0.96, with the result that only the relational expression (1) is met; however, the relational expression (2) of the B index is not met.

Further, in the comparative example 2, the B index of the rubber composites for tire treads is 127.31, with the result that only the relational expression (2) is met; however, the relational expression (1) of the A index is not met. In the comparative example 3, the B index of the rubber composites for tire treads is 129.50, with the result that only the relational expression (2) is met; however, the relational expression (1) of the A index is not met.

Consequently, the comparative examples 2 to 5 failed to accomplish both the improved braking performance and the reduced rolling resistance.

The rubber composites for tire treads produced in the examples 1 to 3 are superior in the mode fuel consumption, on account of the excellent tire driving stiffness (Kx) at 60° C. and the rolling resistance.

Contrary to this, since the comparative example 2 is superior in either the driving transmission performance or the rolling resistance (because the other is inferior), the mode fuel consumption deteriorates than those of the examples 1 to 3.

Figure 4:
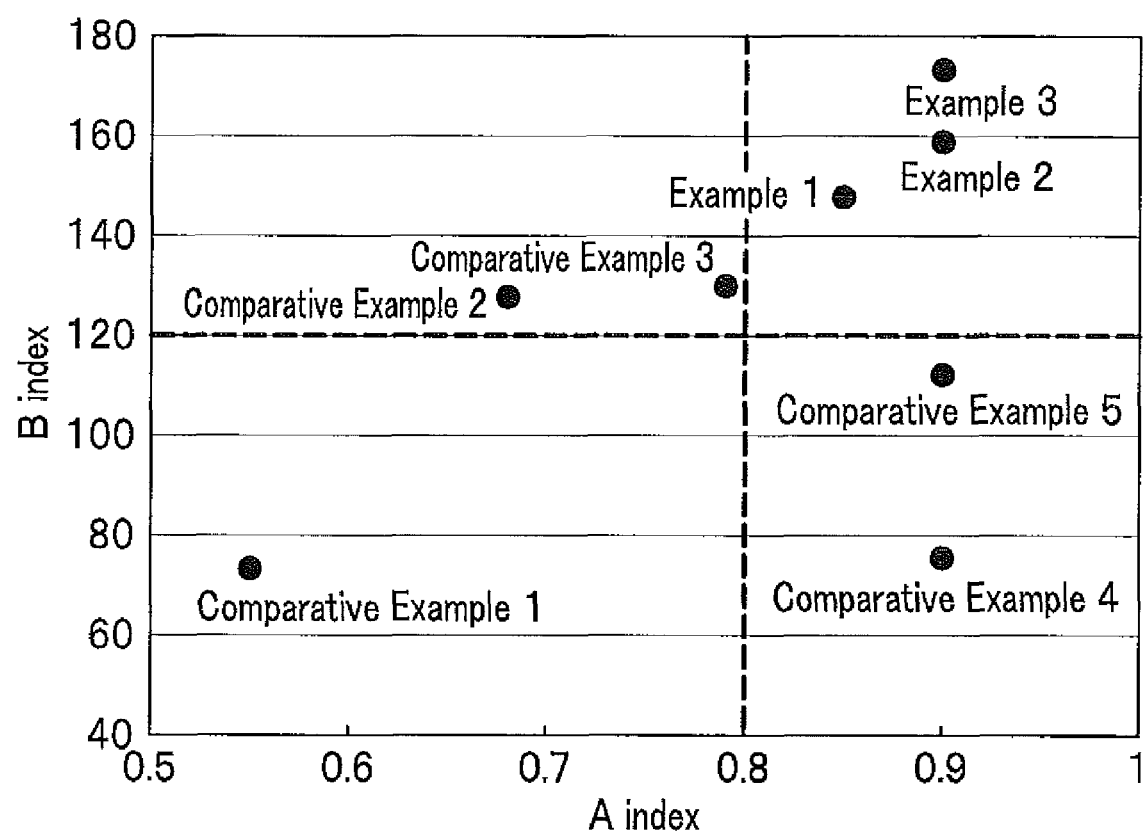
FIG. 4 is a graph plotting distributions of an A index and a B index in examples 1 to 3 and comparative examples 1 to 5, where the A index designates a horizontal direction and the B index designates a vertical direction.

FIG. 4 to be referred to herein is a graph plotting distributions of the A and B indexes of the examples 1 to 3 and comparative examples 1 to 5, where a horizontal axis designates the A index and a vertical axis designates the B index.

As illustrated in FIG. 4, the rubber composites for tire treads of which A index is greater than or equal to 0.8 and of which B index is greater than or equal to 120, and which meet the relational expressions (1) and (2) at the same time are verified that they attain the reduced rolling resistance and the guaranteed good braking performance, which have been heretofore deemed to be impossible with the existing rubber composites for tire treads. In addition, it is certified that the rubber composites for tire treads allow contriving to accomplish both the reduced rolling resistance and the improved tire driving stiffness, thus greatly contributing to an increase in the fuel efficiency of a vehicle equipped therewith.

In this connection, in FIG. 4, there has already been verified by the inventors that the tread rubbers applied to the existing tires (publicly known) belong to a region where the A index is less than 0.8 and the B index is less than 120. In other words, there has been definitely verified by the inventors that the rubber composites for tire treads of the present invention belonging to the region where the A index is greater than or equal to 0.8 and the B index is greater than or equal to 120 are unquestionably the new ones.

What is claimed is:

1. Tire treads comprising rubber composites comprising:
    silica;
    carbon black; and
    oil constituents,
    wherein a ratio (A index) of silica contents, carbon black contents, and oil constituents contents is found by:

$A$ index=silica contents/(carbon black contents+silica contents+oil constituents contents)$\geq$ 0.85     relational expression (1); and a ratio (B index) of a complex elastic modulus E* at 30° C. and a loss tangent tan $\delta$ at 60° C. is found by:

$B$ index=$E^*$/tan $\delta \geq 120$     relational expression (2).

2. A tire wherein the tire treads of claim 1 are applied to a tread section.

* * * * *